(12) United States Patent
Tsuchiya et al.

(10) Patent No.: US 11,412,107 B2
(45) Date of Patent: Aug. 9, 2022

(54) IMAGE PROCESSING APPARATUS AND IMAGE PROCESSING METHOD

(71) Applicant: CANON KABUSHIKI KAISHA, Tokyo (JP)

(72) Inventors: Okinori Tsuchiya, Kanagawa (JP); Kouta Murasawa, Kanagawa (JP); Kazuya Ogasawara, Kanagawa (JP); Tatsuhiro Yamagata, Tokyo (JP); Yugo Mochizuki, Kanagawa (JP); Toshiki Miyazaki, Tokyo (JP); Masao Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/115,228

(22) Filed: Dec. 8, 2020

(65) Prior Publication Data

US 2021/0218865 A1    Jul. 15, 2021

(30) Foreign Application Priority Data

Jan. 9, 2020  (JP) .............................. JP2020-002034

(51) Int. Cl.
*H04N 1/60* (2006.01)
*H04N 1/64* (2006.01)

(52) U.S. Cl.
CPC ........... *H04N 1/646* (2013.01); *H04N 1/6008* (2013.01); *H04N 1/6077* (2013.01)

(58) Field of Classification Search
CPC .. H04N 1/6077; H04N 1/6008; H04N 1/1933; H04N 1/60
See application file for complete search history.

(56) References Cited

U.S. PATENT DOCUMENTS

| | | | |
|---|---|---|---|
| 6,980,326 B2 | 12/2005 | Tsuchiya et al. | 358/1.9 |
| 7,009,734 B2 | 3/2006 | Suwa et al. | 358/1.9 |
| 7,136,523 B2 | 11/2006 | Fukao et al. | 382/167 |
| 7,274,491 B2 | 9/2007 | Yamada et al. | 358/3.06 |
| 7,312,891 B2 | 12/2007 | Tsuchiya et al. | 358/1.9 |
| 7,342,684 B2 | 3/2008 | Imafuku et al. | 358/1.9 |
| 7,355,751 B2 | 4/2008 | Tsuchiya | 358/1.9 |

(Continued)

FOREIGN PATENT DOCUMENTS

| | | |
|---|---|---|
| JP | 2005-110089 | 4/2005 |
| JP | 2013-540390 | 10/2013 |

*Primary Examiner* — Ted W Barnes
(74) *Attorney, Agent, or Firm* — Venable LLP

(57) ABSTRACT

An image processing apparatus performs predetermined image processing for read data obtained by reading an image on a document by first and second reading sensors arranged so as to have an overlapping area. The predetermined image processing includes color correction processing of converting color signals detected by light receiving elements of the reading sensors into color signals with respect to each of pixels forming read data. Color correction processing for first read data obtained from light receiving elements of the first reading sensor not included in the overlapping area and color correction processing for second read data obtained from light receiving elements of the second reading sensor not included in the overlapping area are performed in accordance with different correction characteristics. By doing this, an image in which image unevenness caused by individual differences of the short reading sensors is reduced can be output.

10 Claims, 15 Drawing Sheets

MASK FOR FIRST LIGHT RECEIVING ELEMENT GROUP

701

MASK FOR SECOND LIGHT RECEIVING ELEMENT GROUP

702

703

SUM OF MASK FOR FIRST LIGHT RECEIVING ELEMENT GROUP AND MASK FOR SECOND LIGHT RECEIVING ELEMENT GROUP

(56) References Cited

U.S. PATENT DOCUMENTS

| | | | |
|---|---|---|---|
| 7,414,754 B2 | 8/2008 | Yamazoe | 358/1.9 |
| 7,641,310 B2 | 1/2010 | Tsuchiya | 347/43 |
| 7,643,178 B2 | 1/2010 | Yamada et al. | 358/3.06 |
| 7,688,489 B2 | 3/2010 | Nagoshi et al. | 358/520 |
| 7,706,605 B2 | 4/2010 | Fukao et al. | 382/162 |
| 7,773,258 B2 | 8/2010 | Tsuchiya | 358/1.9 |
| 7,912,280 B2 * | 3/2011 | Miyagi | G06T 5/20 348/222.1 |
| 8,139,849 B2 | 3/2012 | Miyagi et al. | 382/162 |
| 8,233,191 B2 | 7/2012 | Tsuchiya | 358/1.9 |
| 8,456,709 B2 | 6/2013 | Uratani et al. | 358/3.23 |
| 8,619,349 B2 | 12/2013 | Kishino et al. | 358/518 |
| 8,885,932 B2 | 11/2014 | Miyazaki et al. | 382/162 |
| 8,947,730 B2 | 2/2015 | Miyazaki | 358/1.9 |
| 9,111,204 B2 | 8/2015 | Fujita et al. | H04N 1/644 |
| 9,237,252 B2 * | 1/2016 | Verhaegh | H04N 1/193 |
| 9,406,004 B2 | 8/2016 | Yamagata | H04N 1/6019 |
| 2005/0073707 A1 | 4/2005 | Yamazoe | 358/1.9 |
| 2009/0128854 A1 * | 5/2009 | Takei | H04N 1/1912 358/1.15 |
| 2011/0032550 A1 * | 2/2011 | Torigoe | H04N 1/60 358/1.9 |
| 2011/0148969 A1 * | 6/2011 | Nakamura | B41J 2/2146 347/15 |
| 2013/0286451 A1 * | 10/2013 | Verhaegh | H04N 1/1934 358/521 |
| 2017/0195511 A1 * | 7/2017 | Overgaard | H04N 1/0405 |
| 2018/0213107 A1 * | 7/2018 | Momose | H04N 1/1912 |
| 2020/0007695 A1 | 1/2020 | Kagawa et al. | H04N 1/00167 |

* cited by examiner

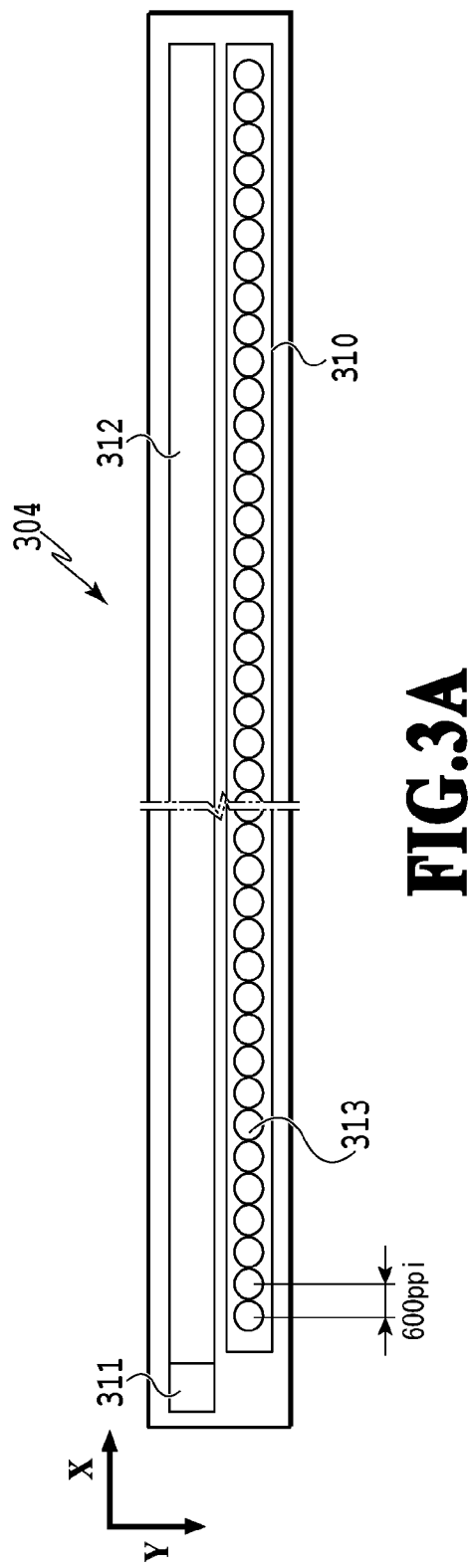
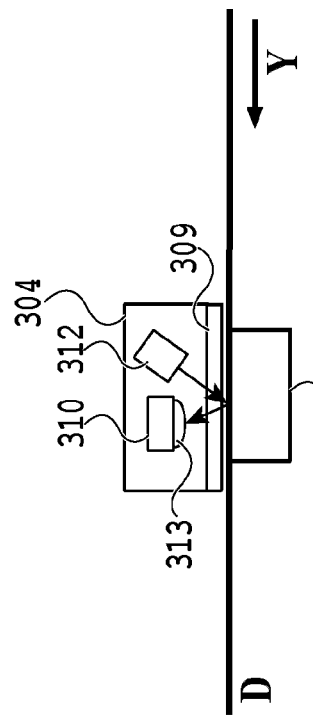
FIG.3A
FIG.3B

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

In some large-format scanners, a plurality of short reading sensors each having an array of light receiving elements are arranged in a width direction of a document to form a long reading sensor. Such a reading sensor can improve yield at the time of manufacture of each reading sensor and reduce cost. In this case, two adjacent short reading sensors are often arranged such that their reading areas overlap each other.

Japanese Patent Laid-Open No. 2013-540390 discloses a method of correcting image unevenness caused by a gap between detection values of image sensors in a configuration in which a plurality of image sensors (reading sensors) are arrayed in a width direction so as to have overlapping areas. More specifically, detection values of all light receiving elements of each image sensor are corrected based on a difference between detection values read in an overlapping area of two image sensors. According to Japanese Patent Laid-Open No. 2013-540390, image unevenness caused by a gap between detection values of adjacent image sensors can be reduced.

In the configuration disclosed in Japanese Patent Laid-Open No. 2013-540390, however, linear correction is performed with respect to detection values of each of single colors such as red, green, and blue. Thus, correction may be insufficient for a color other than the single colors.

In addition, the overlapping area disclosed in Japanese Patent Laid-Open No. 2013-540390 includes a definite boundary between an area in which detection values of one image sensor are subjected to correction for that image sensor and an area in which detection values of the other image sensor are subjected to correction for that image sensor. Accordingly, depending on a document, areas subjected to different types of insufficient correction may be adjacent to each other with a boundary therebetween in an output image and a color gap may be seen at the boundary.

SUMMARY OF THE INVENTION

The present invention has been accomplished in order to solve the above problem. Thus, the object of the present invention is to output an image in which image unevenness caused by individual differences of short reading sensors is reduced in an image processing apparatus which performs document reading processing by the use of a reading sensor obtained by arraying a plurality of short reading sensors.

In a first aspect of the present invention, there is provided an image processing apparatus comprising: a first reading sensor comprising a plurality of light receiving elements arrayed in a predetermined direction; a second reading sensor comprising a plurality of light receiving elements arrayed in the predetermined direction, the second reading sensor being arranged so as to have an overlapping area with the first reading sensor in the predetermined direction; an acquisition unit configured to acquire read data generated by the first reading sensor reading an image on a document during relative movement of the document and the first reading sensor in a cross direction crossing the predetermined direction and read data generated by the second reading sensor reading an image on the document during relative movement of the document and the second reading sensor in the cross direction; and an image processing unit configured to generate a read image of the document by performing predetermined image processing for read data of the first reading sensor and read data of the second reading sensor, wherein the predetermined image processing includes color correction processing of correcting a combination of color signals corresponding to respective color components detected by the light receiving elements with respect to each of pixels forming each of read data of the first reading sensor and read data of the second reading sensor, and the image processing unit performs the color correction processing for first read data obtained from light receiving elements of the first reading sensor not included in the overlapping area and the color correction processing for second read data obtained from light receiving elements of the second reading sensor not included in the overlapping area in accordance with different correction characteristics.

In a second aspect of the present invention, there is provided an image processing method for performing predetermined image processing for read data of a first reading sensor and read data of a second reading sensor and generating a read image of a document by an image processing apparatus, the image processing apparatus comprising: the first reading sensor comprising a plurality of light receiving elements arrayed in a predetermined direction; the second reading sensor comprising a plurality of light receiving elements arrayed in the predetermined direction, the second reading sensor being arranged so as to have an overlapping area with the first reading sensor in the predetermined direction; and an acquisition unit configured to acquire read data generated by the first reading sensor reading an image on a document during relative movement of the document and the first reading sensor in a cross direction crossing the predetermined direction and read data generated by the second reading sensor reading an image on the document during relative movement of the document and the second reading sensor in the cross direction, the image processing method comprising: a color correction processing step of correcting a combination of color signals corresponding to respective color components detected by the light receiving elements with respect to each of pixels forming each of read data of the first reading sensor and read data of the second reading sensor, wherein in the color correction processing step, color correction processing for first read data obtained from light receiving elements of the first reading sensor not included in the overlapping area and color correction processing for second read data obtained from light receiving elements of the second reading sensor not included in the overlapping area are performed in accordance with different correction characteristics.

Further features of the present invention will become apparent from the following description of exemplary embodiments with reference to the attached drawings.

BRIEF DESCRIPTION OF THE DRAWINGS

FIGS. 3A and 3B are diagrams showing the structure of a reading sensor;

DESCRIPTION OF THE EMBODIMENTS

Embodiments of the invention will be hereinafter described with reference to the drawings.

First Embodiment

Figure 1:
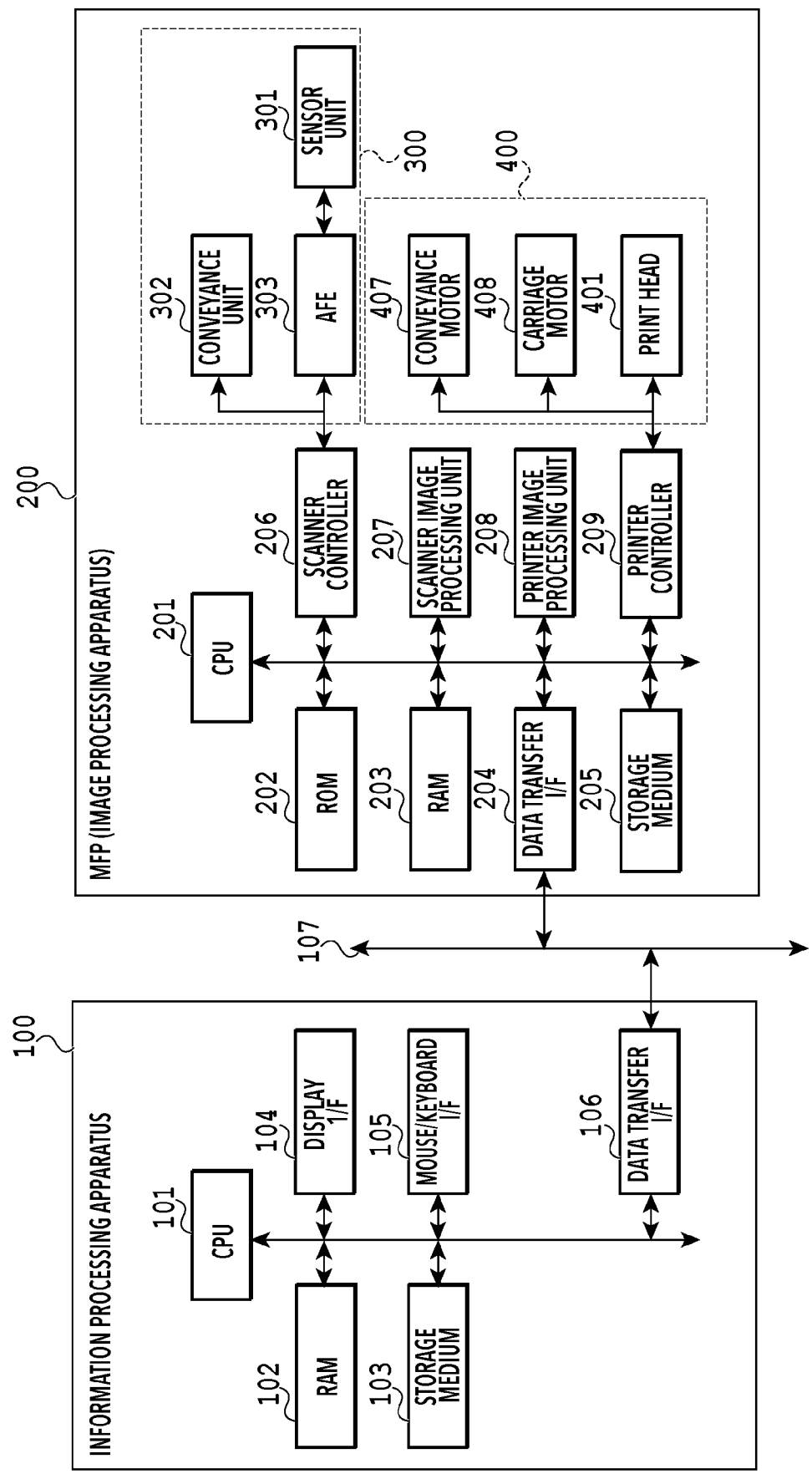
FIG. 1 is a block diagram showing a control configuration of an information processing apparatus and an image processing apparatus.

FIG. 1 is a block diagram showing a control configuration in an information processing apparatus 100 and an image processing apparatus 200 usable in the present invention. In the present embodiment, the information processing apparatus 100 can be a host PC, tablet PC, digital camera, smartphone or the like. The image processing apparatus 200 of the present embodiment is a multi-function printer (hereinafter referred to as MFP) and comprises a scanner unit 300 which performs document reading processing and a printer unit 400 which performs image printing processing for a print medium. The information processing apparatus 100 and the image processing apparatus 200 are connected to each other by a network 107.

The image processing apparatus 200, which is the MFP, can implement a scanner function, print function, and copy function. The scanner function is the function of reading a document using the scanner unit 300 and transmitting the acquired read data to the information processing apparatus 100 or the like. The print function is the function of printing an image on a print medium using the printer unit 400 based on image data received from the information processing apparatus 100. The copy function is the function of printing an image of a document read by the scanner unit 300 on a print medium using the printer unit 400.

In the information processing apparatus 100, a CPU 101 controls the entire apparatus using a RAM 102 as a work area in accordance with a program stored in a storage medium 103. The storage medium 103 is, for example, a hard disk drive or flash memory. A display I/F 104 performs display control in an unshown display under instructions from the CPU 101. A mouse/keyboard I/F 105 transfers information input from an unshown mouse and keyboard to the CPU 101. In the case of a tablet PC, the mouse/keyboard I/F 105 becomes a touch panel control unit. A data transfer I/F 106 is an interface with the network 107 and can use a wired LAN, wireless LAN, USB port or the like.

In the image processing apparatus 200, a CPU 201 controls the entire apparatus using a RAM 203 as a work area in accordance with a program stored in a ROM 202 or a storage medium 205. The storage medium 205 is, for example, a hard disk drive or flash memory.

A scanner controller 206 controls the scanner unit 300 under instructions from the CPU 201. Read data acquired by the scanner unit 300 is stored in the RAM 203. A scanner image processing unit 207 performs predetermined image processing for read data stored in the RAM 203 under instructions from the CPU 201. More specifically, the scanner image processing unit 207 performs shading correction for correcting unevenness of a plurality of light receiving elements provided in a sensor unit 301, linearity correction for adjusting linearity of output values of the light receiving elements, correction processing to be described later, and the like. The scanner image processing unit 207 may perform filtering processing for adjusting sharpness and processing for adjusting a dynamic range or gray scale.

The scanner unit 300 has a conveyance unit 302 for conveying a document, the sensor unit 301 for reading a document, and an analog front end 303 (hereinafter AFE) for converting an analog signal detected by the sensor unit 301 into a digital signal. The conveyance unit 302 may be configured to move the sensor unit 301 relative to a positioned document.

A printer image processing unit 208 performs predetermined image processing for image data stored in the RAM 203 and generates new image data for printing in the printer unit 400 under instructions from the CPU 201. More specifically, the printer image processing unit 208 converts RGB multi-valued data forming image data into multi-valued data corresponding to CMYK ink colors used by the printer unit 400 and quantizes the converted multi-valued data into binary data indicating printing (1) or non-printing (0) of dots.

A printer controller 209 controls the printer unit 400 under instructions from the CPU 201. The printer unit 400 includes a print head 401 for printing an image on a print medium, a conveyance motor 407 for conveying a print medium, and a carriage motor 408 for moving the print head with respect to a print medium. A data transfer I/F 204 is an interface with the network 107 and can use a wired LAN, wireless LAN, USB port or the like.

The image processing apparatus 200 may be equipped with an operation unit comprising a display unit and various key switches for accepting instructions from a user not via the information processing apparatus 100.

The scanner image processing unit 207 and the printer image processing unit 208 are image processing accelerators capable of executing image processing at higher speed than the CPU 201. The image processing accelerators are activated by the CPU 201 writing a parameter and data necessary for image processing to a predetermined address in the RAM 203, read the parameter and data, and then execute predetermined image processing for the read data. However, the image processing accelerators are not essential elements in the present embodiment. The image processing may be performed by the CPU 201. The parameter necessary for the image processing may be stored in the ROM 202 or an external storage such as an external flash memory or HDD.

Figure 2A:
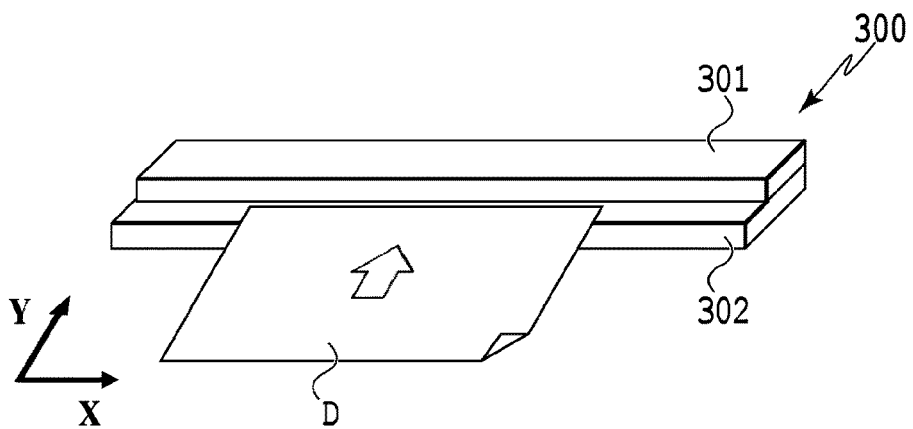
FIGS. 2A to 2C are schematic configuration diagrams of a scanner unit.
Figure 2B:
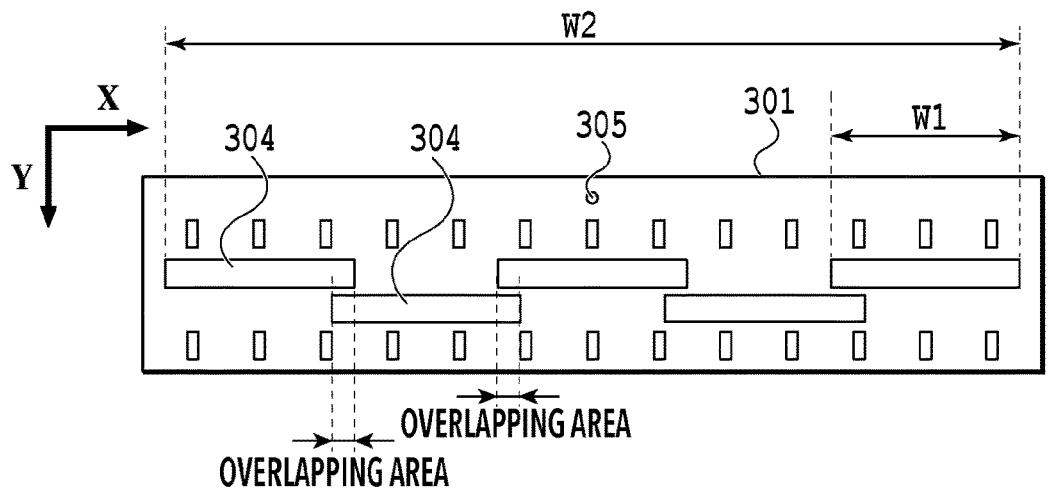
Figure 2C:
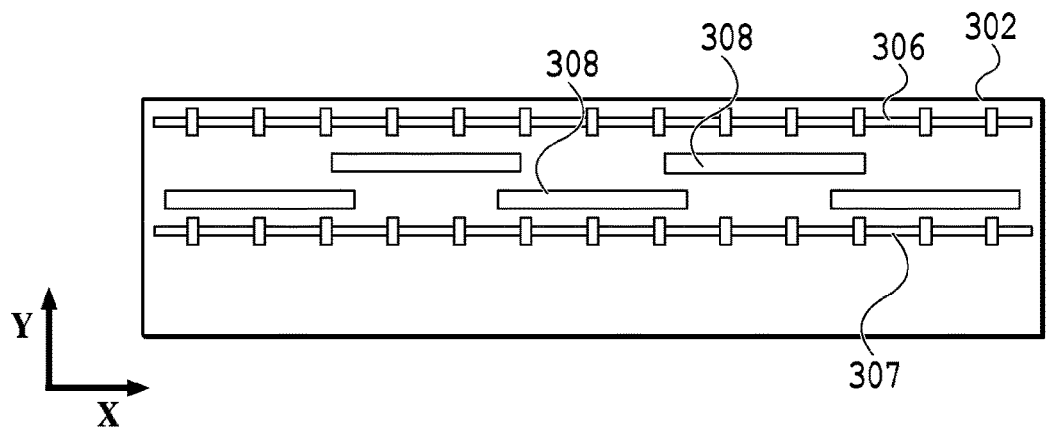

FIGS. 2A to 2C are schematic configuration diagrams of the scanner unit 300. The scanner unit 300 mainly comprises the sensor unit 301 and the conveyance unit 302. In the following description of the scanner unit 300, a conveyance direction of a document is a Y direction and a width direction of a document crossing the Y direction is an X direction. As shown in FIG. 2A, a document D inserted between the sensor unit 301 and the conveyance unit 302 is conveyed by the conveyance unit 302 in the Y direction at a predetermined speed. During the conveyance, an image on a surface is read by the sensor unit 301.

FIG. 2B is a schematic configuration diagram of the sensor unit 301. In the present embodiment, five reading sensors 304 having a width W1 are arrayed so as to have areas overlapping one another, whereby a read width W2 is realized. In the present embodiment, the width W1 corresponds to the width of A4 and the width W2 corresponds to the width of AO. A document detecting sensor 305 is a sensor for detecting the presence or absence of a document D. The scanner controller 206 determines a front or rear end of a document D based on a detection result of the document detecting sensor 305 and controls the sensor unit 301 and the conveyance unit 302.

FIG. 2C is a schematic configuration diagram of the conveyance unit 302. A document D is conveyed in the Y direction by a front conveyance roller 306 and a rear conveyance roller 307. Pressure plates 308 for supporting a document D are provided in positions corresponding to the respective reading sensors 304 between the front conveyance roller 306 and the rear conveyance roller 307.

FIGS. 3A and 3B are diagrams showing the structure of the reading sensor 304. FIG. 3A shows the reading sensor 304 from the document D side. FIG. 3B is a cross-sectional view of the reading sensor 304. The reading sensor 304 of the present embodiment is a contact image sensor (CIS) and has a light source 311, a light guide 312, a reading substrate 310, light receiving elements 313, and document glass 309.

The light source 311 includes light-emitting diodes which emit light of red (R), blue (B), and green (G), respectively. The light receiving elements 313 are arrayed in the X direction at a density of 600 ppi (pixels per inch) on the reading substrate 310.

In reading processing, as shown in FIG. 3B, a document D is pressed against the flat document glass 309 by the flat pressure plate 308. The pressure plate 308 and the document glass 309 support the document flat, whereby a distance between the document D and the light receiving elements 313 can be kept constant and blurring (defocusing) of a read image can be prevented.

After reading processing is started and the document detecting sensor 305 detects a document, the scanner controller 206 turns on the light source 311 while conveying a document D at a predetermined speed. In the case of color reading processing, the light-emitting diodes of R, G, and B are sequentially turned on. In the case of monochrome reading processing, one or all of the light-emitting diodes of the three colors are turned on. Light emitted from the light source 311 is guided by the light guide 312 to the entire area of the reading sensor 304 in the X direction to irradiate the document D through the document glass 309. Light reflected from the surface of the document D passes through the document glass 309 again and is received by the light receiving elements 313 arrayed in the X direction. Each light receiving element 313 stores electric charge corresponding to the intensity of the received light. The stored electric charge is converted into a digital signal value by the AFE 303 in synchronization with a timing instructed by the scanner controller 206, that is, a timing corresponding to one pixel. The scanner controller 206 stores the converted digital signal values in the RAM 203 per color and pixel. The read data stored in the RAM 203 is then subjected to predetermined image processing by the scanner image processing unit 207 (see FIG. 1). Specific image processing performed by the scanner image processing unit 207 will be described later in detail.

Figure 4A:
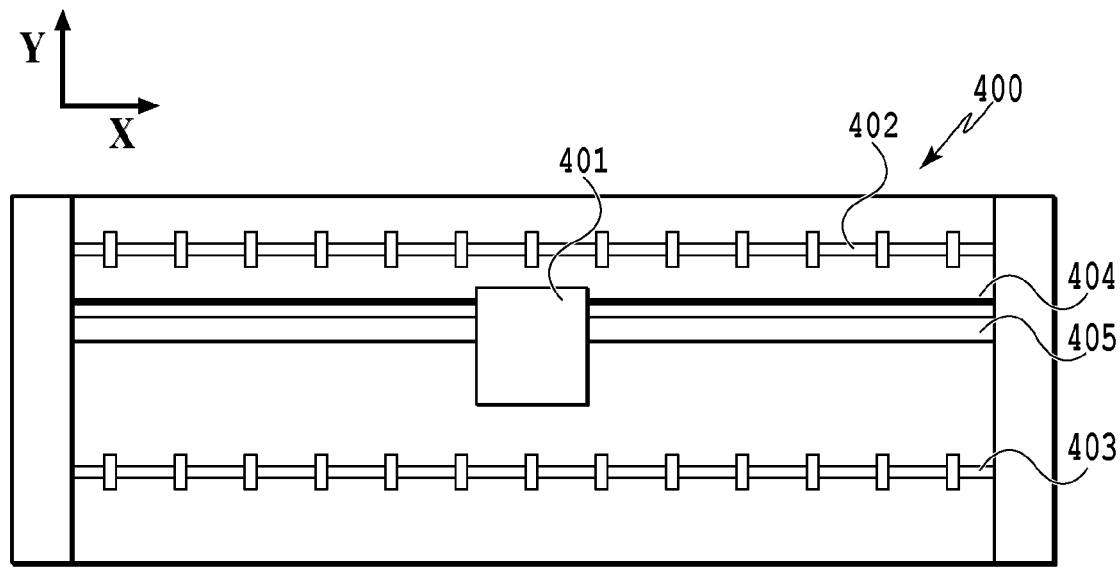
FIGS. 4A and 4B are schematic configuration diagrams of a printer unit.
Figure 4B:
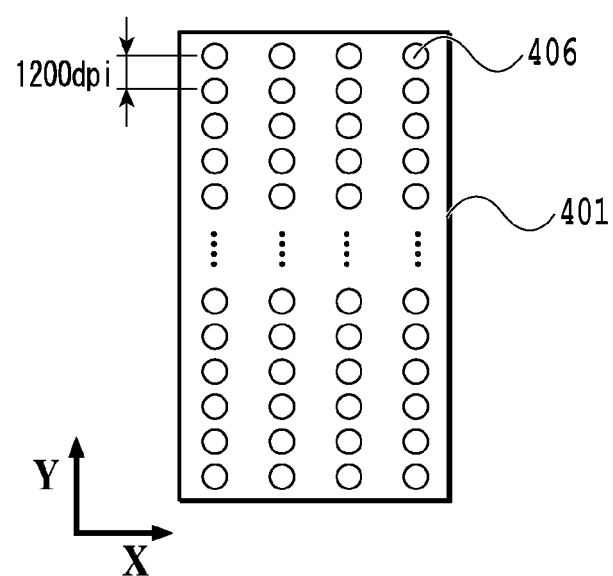

FIGS. 4A and 4B are schematic configuration diagrams of the printer unit 400. In the following description of the printer unit 400, a conveyance direction of a sheet is a Y direction and a width direction of a sheet is an X direction. In FIG. 4A, an unshown sheet is conveyed in the Y direction by a front conveyance roller 402 and a rear conveyance roller 403. The print head 401 is reciprocally movable in ±X directions in the drawings between the front conveyance roller 402 and the rear conveyance roller 403 while being guided and supported by a guide shaft 405.

FIG. 4B is a diagram showing an arrayed state of ejection openings 406 in the print head 401. In the present embodiment, ejection opening arrays corresponding to cyan (C), magenta (M), yellow (Y), and black (K), respectively, are arrayed in the X direction. In each ejection opening array, a plurality of ejection openings 406 are arrayed in the Y direction at a density of 1200 dpi (dots per inch). Under the above configuration, a print scan in which the print head 401 ejects ink while moving in the X or X' direction and conveyance operation in which a sheet is conveyed in the Y direction are alternately repeated, whereby a color image having a resolution of 1200 dpi can be printed on the sheet. In addition to the above four colors, the print head 401 may be configured to eject inks of light cyan (Lc), light magenta (Lm), gray (Gy) and the like in order to improve image quality.

Figure 5:
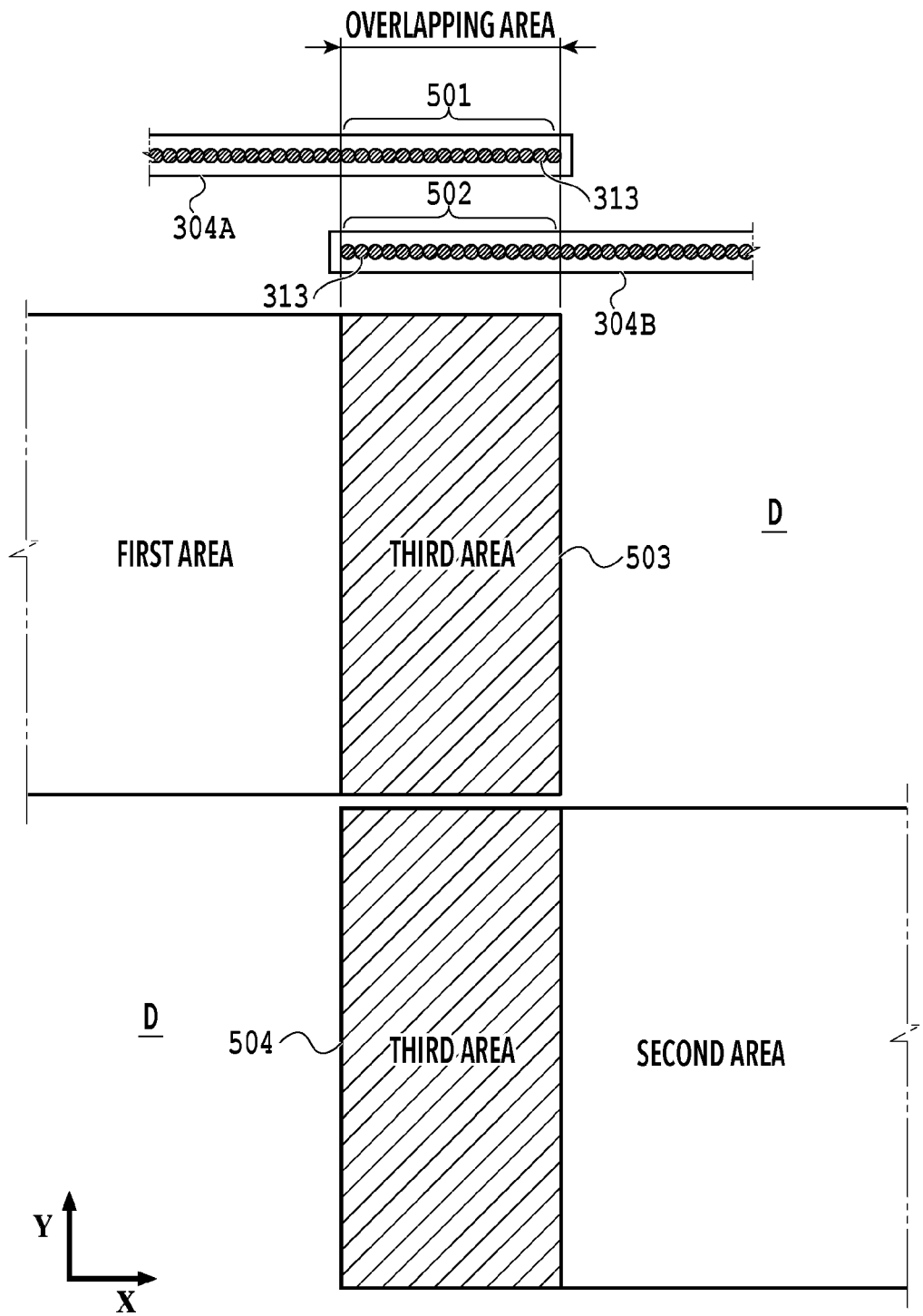
FIG. 5 is a diagram illustrating reading areas of two reading sensors.

FIG. 5 is a diagram illustrating reading areas of two reading sensors 304 of the scanner unit 300 on a document D. For convenience of description, the left one in the drawing is referred to as a first reading sensor 304A and the right one is referred to as a second reading sensor 304B. The first reading sensor 304A and the second reading sensor 304B are arranged so as to overlap each other in the X direction.

Here, a group of light receiving elements 313 of the first reading sensor 304A included in the overlapping area is defined as a first light receiving element group 501 and a group of light receiving elements 313 of the second reading sensor 304B included in the overlapping area is defined as a second light receiving element group 502. In a document D conveyed in the Y direction, an area read by light receiving elements 313 of the first reading sensor 304A not included in the first light receiving element group 501 is defined as a first area. An area read by light receiving elements 313 of the second reading sensor 304B not included in the second light receiving element group 502 is defined as a second area. Further, in a document D, an area read by the first light receiving element group and the second light receiving element group is defined as a third area.

The first reading sensor 304A and the second reading sensor 304B comprise individual light sources 311, which include individual differences to some extent.

Figure 6A:
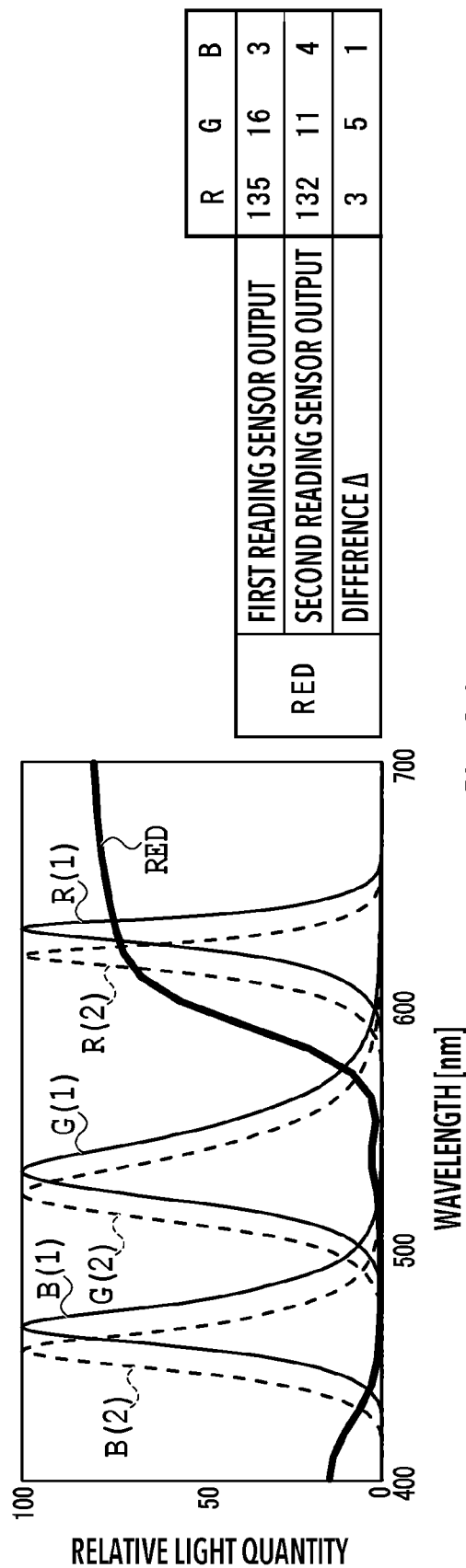
FIGS. 6A and 6B are diagrams showing a relationship between spectral characteristics of light sources and image colors.
Figure 6B:
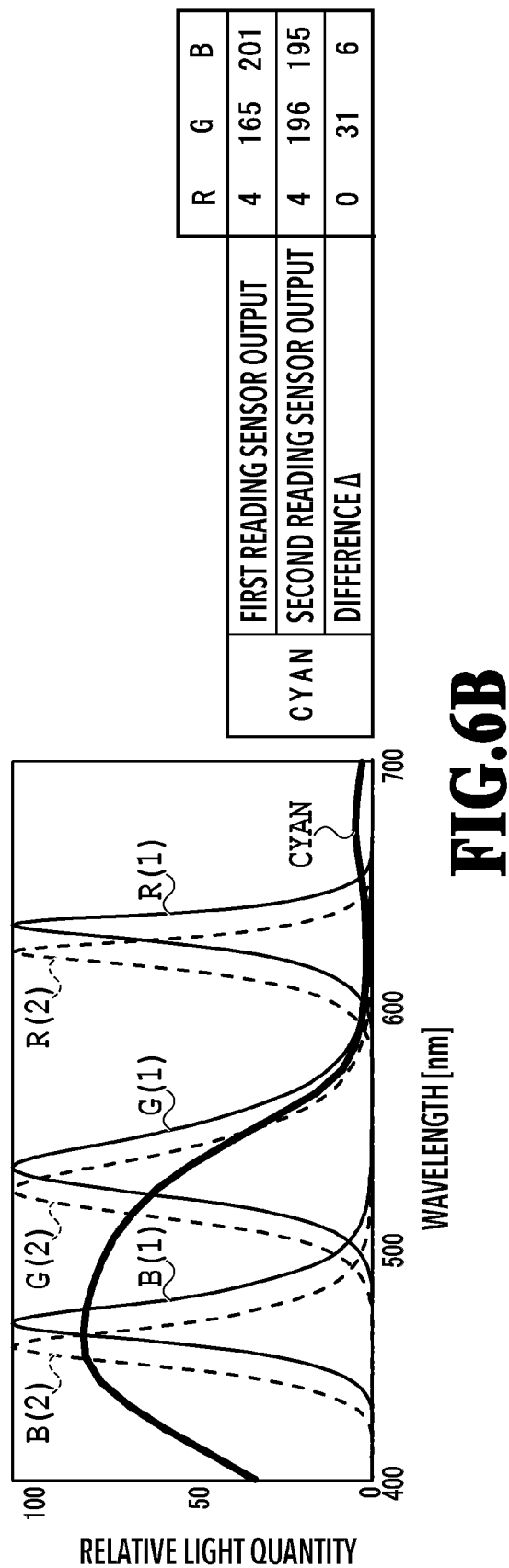

FIGS. 6A and 6B are diagrams showing a relationship between individual differences in spectral characteristics of the light sources 311 and image colors. In both graphs, the horizontal axis represents a wavelength and the vertical axis represents a relative light quantity. R (1), G (1), and B (1) shown by solid lines indicate spectral characteristics of red, green, and blue, respectively, of the light source 311 of the first reading sensor 304A. R (2), G (2), and B (2) shown by dashed lines indicate spectral characteristics of red, green, and blue, respectively, of the light source 311 of the second reading sensor 304B. As shown in the graphs, even light-emitting diodes of the same color may include some shifts in spectral characteristics.

In the graphs of FIGS. 6A and 6B, spectral distributions of red and cyan images are shown by thick lines, respectively, in addition to the spectral characteristics of the light sources 311 described above. Tables on the right of the graphs show R, G, and B detection values (luminance values from 0 to 255) of the first reading sensor 304A and the second reading sensor 304B in a case where reading processing is performed for red and cyan images.

As shown in FIG. 6A, in the case of a red image, there is little difference in all of the R, G, and B detection values between the first reading sensor 304A and the second reading sensor 304B. This is because the spectral distribution of red is nearly unchanged and stable in a range of wavelength in which the spectral characteristics of the first reading sensor 304A and the spectral characteristics of the second reading sensor 304B are shifted from each other. That is, in a case where a document is a red image, no particular correction processing is necessary for detection values of the first reading sensor 304A and detection values of the second reading sensor 304B.

In contrast, in the case of a cyan image shown in FIG. 6B, the spectral distribution of cyan shown by the thick line largely changes especially in a range of wavelength of G color in which the spectral characteristics of the first reading sensor 304A and the spectral characteristics of the second reading sensor 304B are shifted from each other. Accordingly, even in a case where the same cyan image is read, a large difference in detection values is made between the first reading sensor 304A and the second reading sensor 304B. That is, in a case where a document is a cyan image, correction processing is necessary for output values of the first reading sensor 304A and output values of the second reading sensor 304B.

As described above, the necessity for correction of output values of the first reading sensor 304A and output values of the second reading sensor 304B and the degree of required correction depend on a color of an image.

In view of the above, it is preferable that individual correction processing be performed for each of the first, second, and third areas in FIG. 5. In the present embodiment, since five reading sensors 304 are provided, there are five non-overlapping areas like the first and second areas and four overlapping areas like the third area. Thus, it is preferable that individual correction be performed for each of the nine areas in the sensor unit 301 of the present embodiment.

«Correction Processing in Japanese Patent Laid-Open No. 2013-540390»

First, correction processing performed in Japanese Patent Laid-Open No. 2013-540390 will be briefly described with reference to FIG. 5. In Japanese Patent Laid-Open No. 2013-540390, detection values of the first light receiving element group 501 in the third area are compared with detection values of the second light receiving element group 502 in the third area. A correction coefficient for the first reading sensor 304A and a correction coefficient for the second reading sensor 304B are calculated so as to make up the gap between the detection values. After that, with respect to the first area, detection values detected by the light receiving elements of the first reading sensor 304A are corrected by the correction coefficient for the first reading sensor 304A. With respect to the second area, detection values detected by the light receiving elements of the second reading sensor 304B are corrected by the correction coefficient for the second reading sensor 304B. With respect to the third area, detection values detected by light receiving elements of either one of the first reading sensor 304A and the second reading sensor 304B closer to the center of each reading sensor are corrected by the correction coefficient for that reading sensor 304. The correction described above is performed with respect to each of R, G, and B.

In Japanese Patent Laid-Open No. 2013-540390, for example, in the case of reading a document in which the third area is a red image, G detection signals are hardly corrected in both the first and second areas. However, in a case where the first and second areas of the same document are cyan images, a color shift of Δ=31 is generated in G detection signals between the first and second areas in the read image (see FIG. 6).

In addition, in Japanese Patent Laid-Open No. 2013-540390, the third area includes a definite boundary between an area based on detection values of the first reading sensor 304A and an area based on detection values of the second reading sensor 304B. Accordingly, areas derived from different reading sensors are adjacent to each other with a boundary therebetween in an output image and a color gap may be recognized at the boundary depending on a document.

As described above, according to the configuration of Japanese Patent Laid-Open No. 2013-540390 in which detection values of each reading sensor are corrected with respect to each of R, G, and B based on only the third area of a document image, color correction of the entire document cannot be appropriately performed with respect to all image colors.

«Color Correction Processing of Present Embodiment»

A description will be given of color correction processing executed by the scanner image processing unit 207 of the present embodiment. The scanner image processing unit 207 performs color correction processing for read data stored in the RAM 203 by the scanner controller 206. The read data is a group of RGB detection values stored per pixel of 600 dpi and is stored per reading sensor 304. That is, read data 503 of the first reading sensor 304A and read data 504 of the second reading sensor 304B shown in FIG. 5 are individually stored in the RAM 203.

The scanner image processing unit 207 first performs predetermined merging processing for the third area including both of the read data 503 of the first reading sensor 304A and the read data 504 of the second reading sensor 304B, thereby determining a single detection value with respect to each pixel of the third area.

Figure 7:
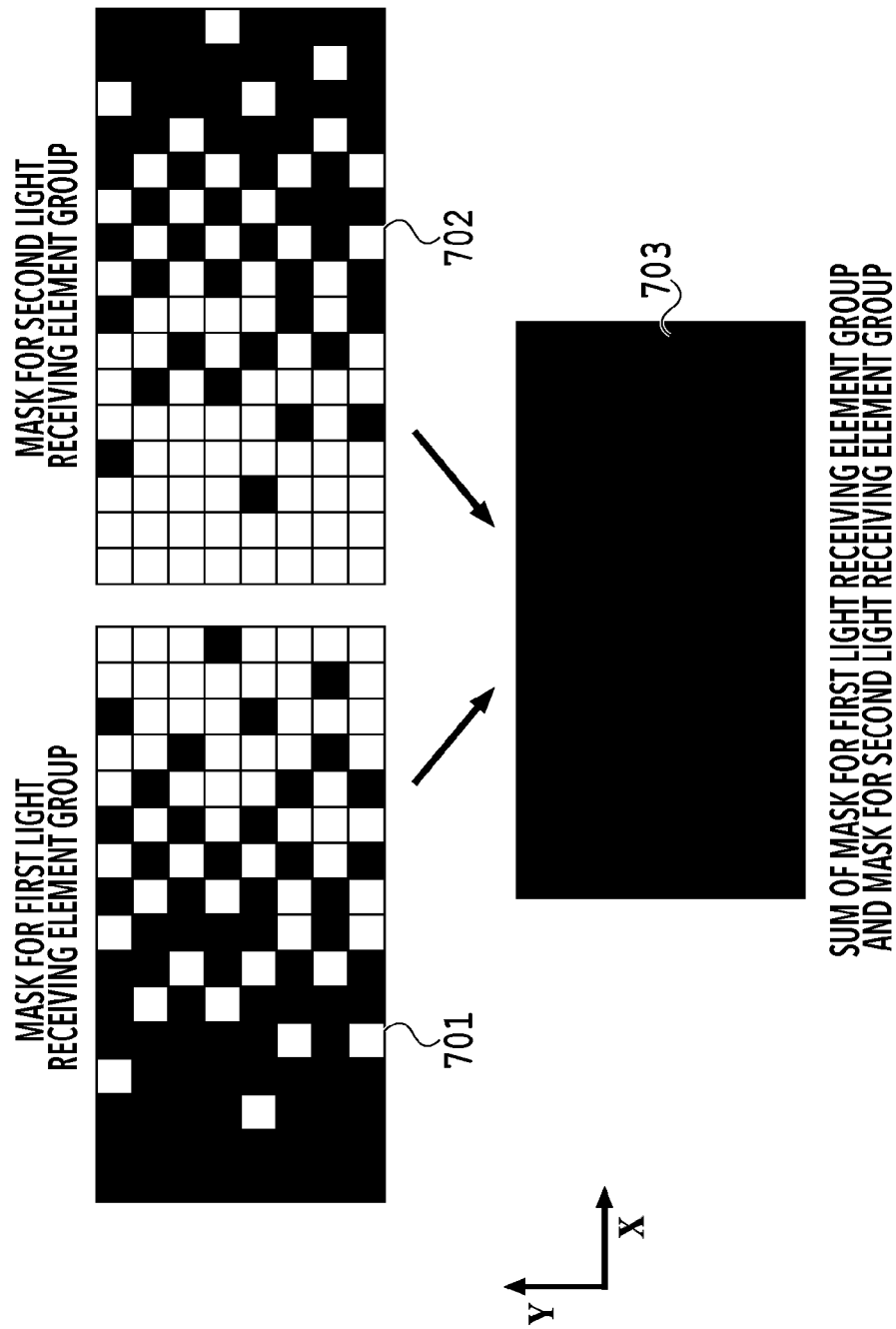
FIG. 7 is a diagram illustrating merging processing.

FIG. 7 is a diagram illustrating the merging processing. In the present embodiment, a first mask pattern 701 and a second mask pattern 702 are used for the merging processing. It is assumed that these mask patterns are prestored in the ROM.

The first mask pattern 701 sets adoption or non-adoption of a detection value in the first read data 503 per pixel. The second mask pattern 702 sets adoption or non-adoption of a detection value in the second read data 504 per pixel. In each mask pattern, the X direction corresponds to the width direction of a document, that is, the array direction of the light receiving elements 313. The Y direction corresponds to the conveyance direction of a document. Black pixels indicate pixels in which detection values are adopted and white pixels indicate pixels in which detection values are not adopted.

As shown in FIG. 7, the first mask pattern 701 and the second mask pattern 702 are complementary to each other. The scanner image processing unit 207 uses the first mask pattern 701 to determine adoption or non-adoption of a detection value of each pixel of the first read data 503 and uses the second mask pattern 702 to determine adoption or non-adoption of a detection value of each pixel of the second read data 504. As a result, every pixel included in the third area is determined to have a detection value obtained from either one of the first light receiving element group 501 and the second light receiving element group 502.

As shown in FIG. 7, in each of the first mask pattern 701 and the second mask pattern 702, the rate of adoption of detection values gradually increases from the end to the center of the reading sensor 304. In other words, in the third area, pixels in which detection values of the first reading sensor 304A are adopted and pixels in which detection values of the second reading sensor 304B are adopted are mixed with each other such that the ratio between them gradually changes. As a result, the read data after the merging processing includes no definite boundary between the detection values of the first reading sensor 304A and the detection values of the second reading sensor 304B. Thus, no color gap is recognized in a specific position in the read image.

The third area shown in FIG. 5 has been described as a target of the merging processing with reference to FIG. 7. In the present embodiment, however, since five reading sensors 304 are provided, the merging processing is necessary for four overlapping areas. That is, the scanner image processing unit 207 executes the merging processing described above for all of the four overlapping areas.

Figure 8:
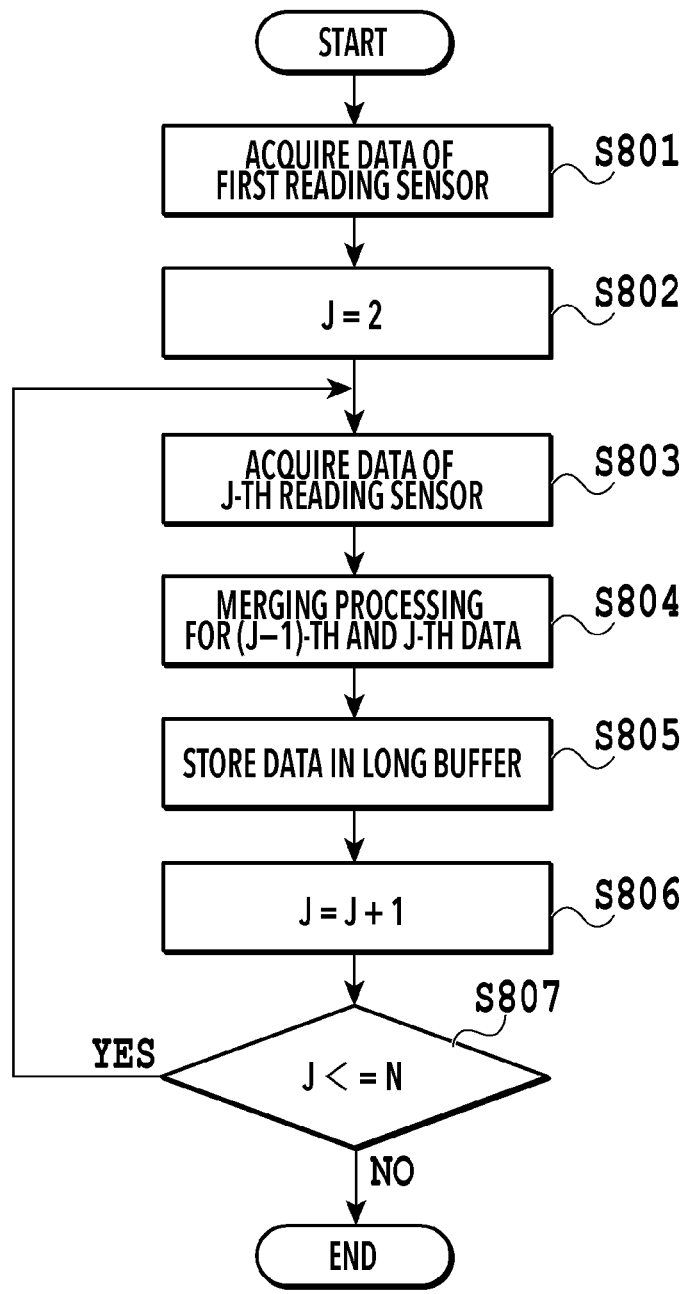
FIG. 8 is a flowchart illustrating the steps of generating read data.

FIG. 8 is a flowchart illustrating the steps of, by the scanner image processing unit 207, combining read data of a plurality of reading sensors stored in the RAM 203 into one read data while performing the merging processing described above. The processing is started when read data of the reading sensors 304 is accumulated in the RAM 203 to a certain extent after the scanner unit 300 starts reading processing.

If the processing is started, in S801, the scanner image processing unit 207 first acquires read data of the first (J=1) reading sensor 304 of the N (5 in the present embodiment) reading sensors 304 arrayed in the X direction. In S802, the scanner image processing unit 207 sets a variable J at J=2.

In S803, the scanner image processing unit 207 acquires read data of the J-th reading sensor 304. In S804, the scanner image processing unit 207 performs the merging processing for read data of the (J−1)-th reading sensor 304 and the read data of the J-th reading sensor 304. More specifically, the scanner image processing unit 207 uses the first mask pattern 701 and the second mask pattern 702 to determine adoption or non-adoption of detection values in an area corresponding to an overlapping area.

In S805, the scanner image processing unit 207 stores, in a long memory secured in the RAM 203, read data on the area for which the merging processing is performed and detection values are determined in S804.

After that, the scanner image processing unit 207 increments the variable J in S806 and determines whether J≤N in S807. In a case of J≤N, the scanner image processing unit 207 returns to S803 and repeats the processing for the J-th reading sensor 304. In a case of J>N in S807, the processing is finished.

The processing described with reference to FIG. 8 generates read data in which pixels are associated with RGB detection values in a one-to-one relationship. In a read image based on the read data thus generated, no color gap is conspicuous in a specific position.

Although the above merging processing reduces a color gap in a specific position, the read image as a whole still includes a difference in color caused by a difference between the spectral characteristics of the light sources as described with reference to FIG. 6. In addition, the present inventors have found a new problem of granularity caused by the above merging processing.

Figure 9:
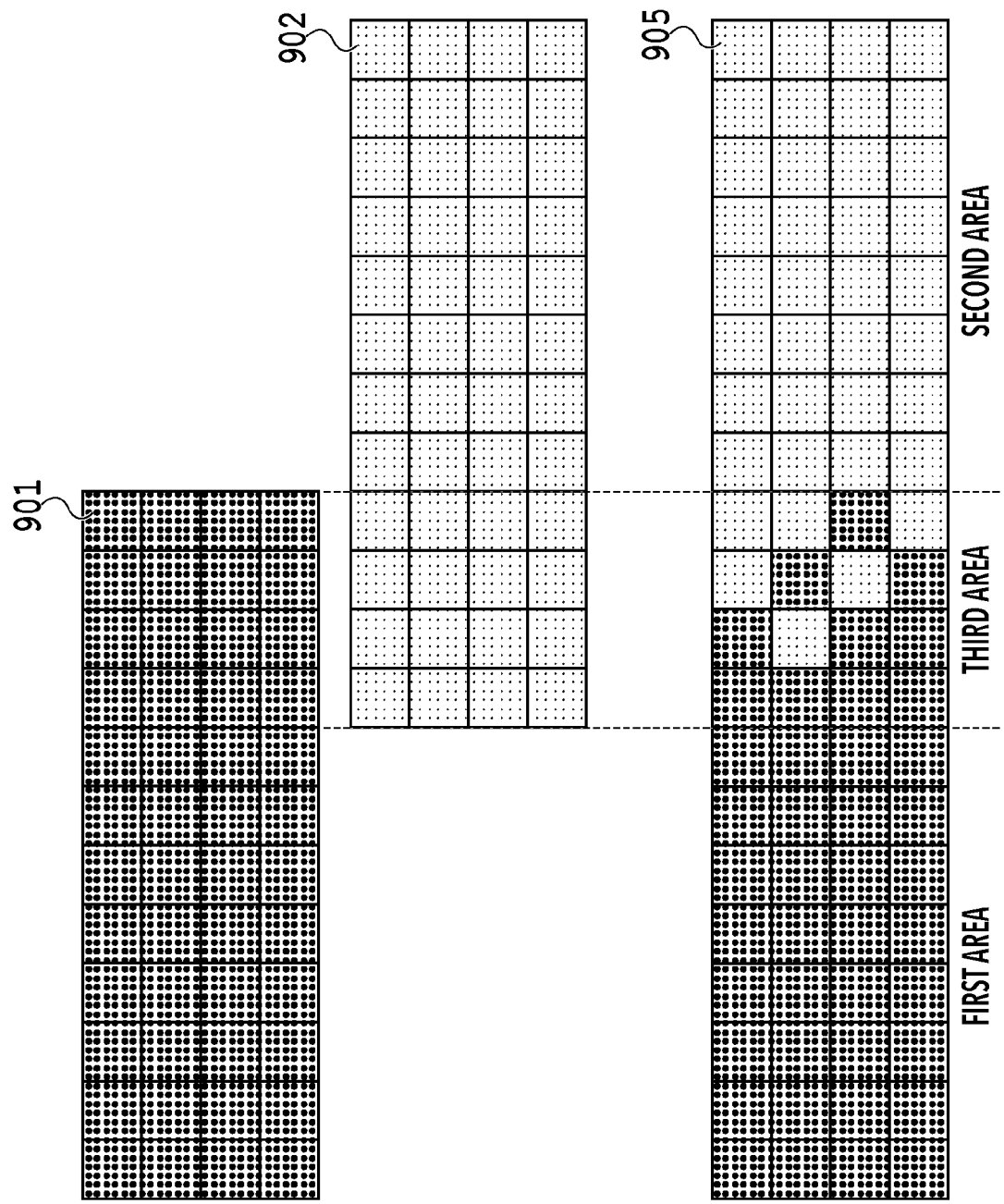
FIG. 9 is a diagram showing granularity provided for a read image by a dark current.

FIG. 9 is a diagram showing granularity provided for a read image by a dark current flowing through the reading sensors. The dark current means an output current of a photoelectric light receiving element that flows because of heat or crystal defect even when there is no incident light. The flow of the dark current generates noise in an output current of each light receiving element, which is seen as granularity in a read image.

The granularity becomes apparent in the case of reading a high concentration image with a small quantity of reflected light. Further, since the amplitude and period of noise are different for each reading sensor, granularity in a read image also have different features for areas corresponding to the respective reading sensors.

FIG. 9 schematically shows a read image 901 of the first reading sensor 304A, a read image 902 of the second reading sensor 304B, and a read image 905 obtained by the merging processing. In the read image 905, the first area has the same granularity as that of the read image 901 and the second area has the same granularity as that of the read image 902. Granularity seen in the third area for which the merging processing has been performed has a feature different from both of the first area and the second area. This is because a spatial frequency of the mask patterns used for the merging processing is added to the spatial frequency characteristics of noise in the first area and the spatial frequency characteristics of noise in the second area. Such differences in granularity are seen as differences in color components such as hue and lightness in the read image. In short, in a read image obtained by performing the merging processing, a color gap in a specific position can be reduced but a difference in granularity and a color shift are often seen in each of the first, second, and third areas.

In consideration of the above, the present inventors have found that it is effective to perform individual color correction processing for each of the areas such as the first, second, and third areas. Thus, an individual color correction table is prepared per area in the present embodiment.

Figure 10:
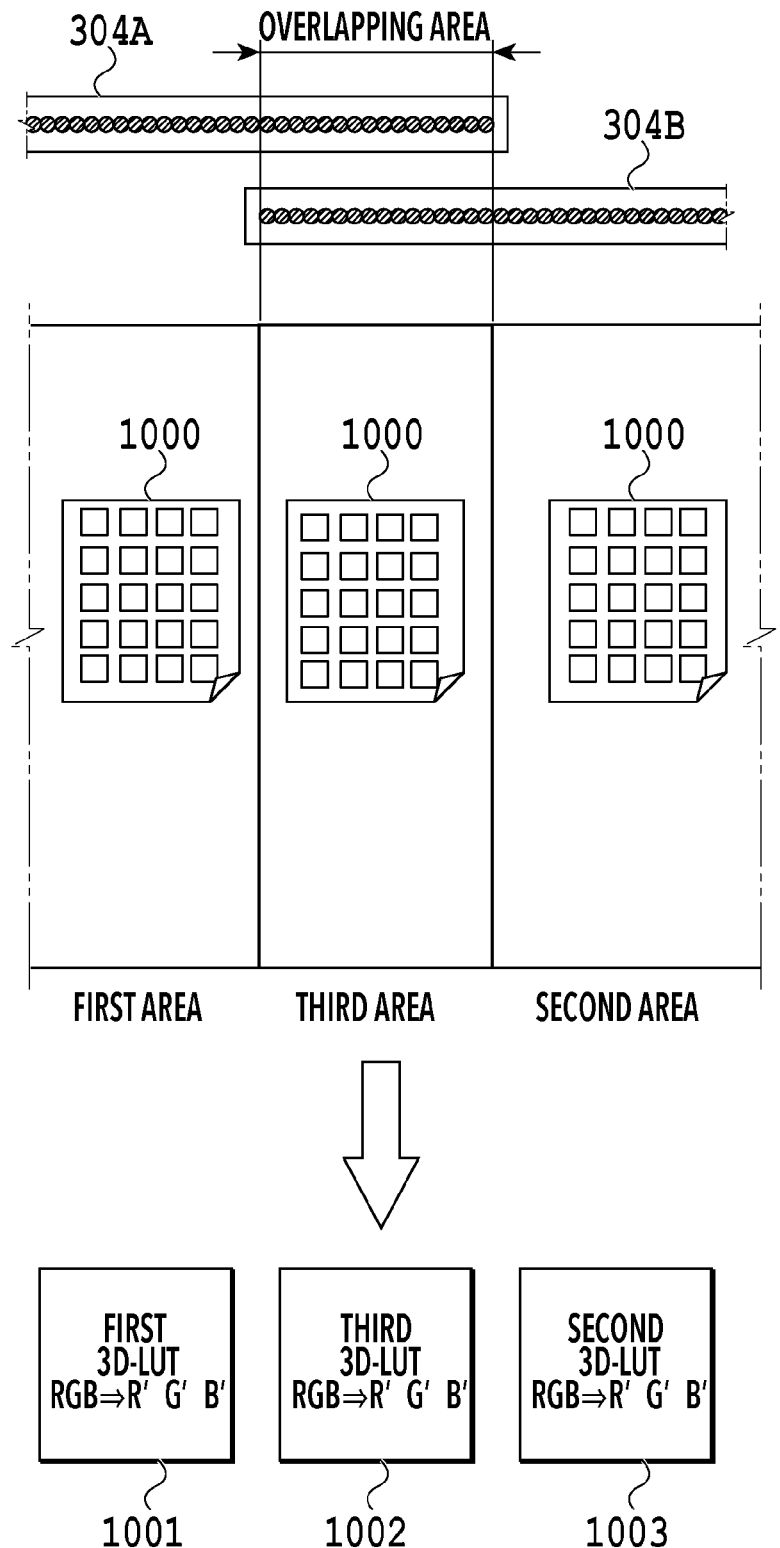
FIG. 10 is a diagram illustrating a method of generating color correction tables.

FIG. 10 is a diagram illustrating a method of generating color correction tables. First, a common color correction document 1000 readable per area is prepared. On the color correction document 1000, a plurality of color patches whose color coordinates are uniformly distributed in a three-dimensional space of RGB are printed. Reading processing of the color correction document 1000 is performed in each area and the merging processing described above is then performed.

After that, a three-dimensional look-up table (hereinafter referred to as 3D-LUT) for color correction is generated per area based on a well-known color matching technique as disclosed in Patent Laid-Open No. 2005-110089 for example. In the case of FIG. 10, a 3D-LUT 1001 for the first area, a 3D-LUT 1003 for the second area, and a 3D-LUT 1002 for the third area are generated. In a case of generating the 3D-LUTs by using the color matching technique, a color standard such as sRGB can be a target. The generated 3D-LUTs 1001 to 1003 are stored in association with the respective areas in the ROM 202 such that they are invoked from the ROM 202 by the scanner image processing unit 207 and used for color correction processing each time the MFP 200 performs reading processing.

Although FIG. 10 only shows the first to third areas for convenience of description, there are nine areas in the X direction in the present embodiment using five reading sensors 304. That is, reading processing of the color correction document 1000, merging processing, and generation processing and storage processing of the 3D-LUT are performed for each area.

The procedure for generating and storing 3D-LUTs described above may be performed in a factory before shipment of the MFP 200 or may be performed as a calibration mode at a suitable timing after arrival under a user's instruction or the like.

The 3D-LUTs 1001 to 1003 are invoked from the ROM 202 by the scanner image processing unit 207 and used for color correction processing in a case where the MFP 200 performs reading processing.

The 3D-LUTs 1001 to 1003 are conversion tables for associating color coordinates (R, G, B) obtained from detection values of each reading sensor 304 with color coordinates (R, G, B) in the standard RGB space. In other words, conversion processing using these 3D-LUTs 1001 to 1003 converts a combination of RGB luminance values of each pixel into a different combination of RGB luminance values. By the conversion processing, detection values RGB of every reading sensor 304 are converted into RGB capable of representing luminance values in the standard color space. As a result, a color shift caused by individual differences of the reading sensors is reduced in the corrected read image.

Figure 11:
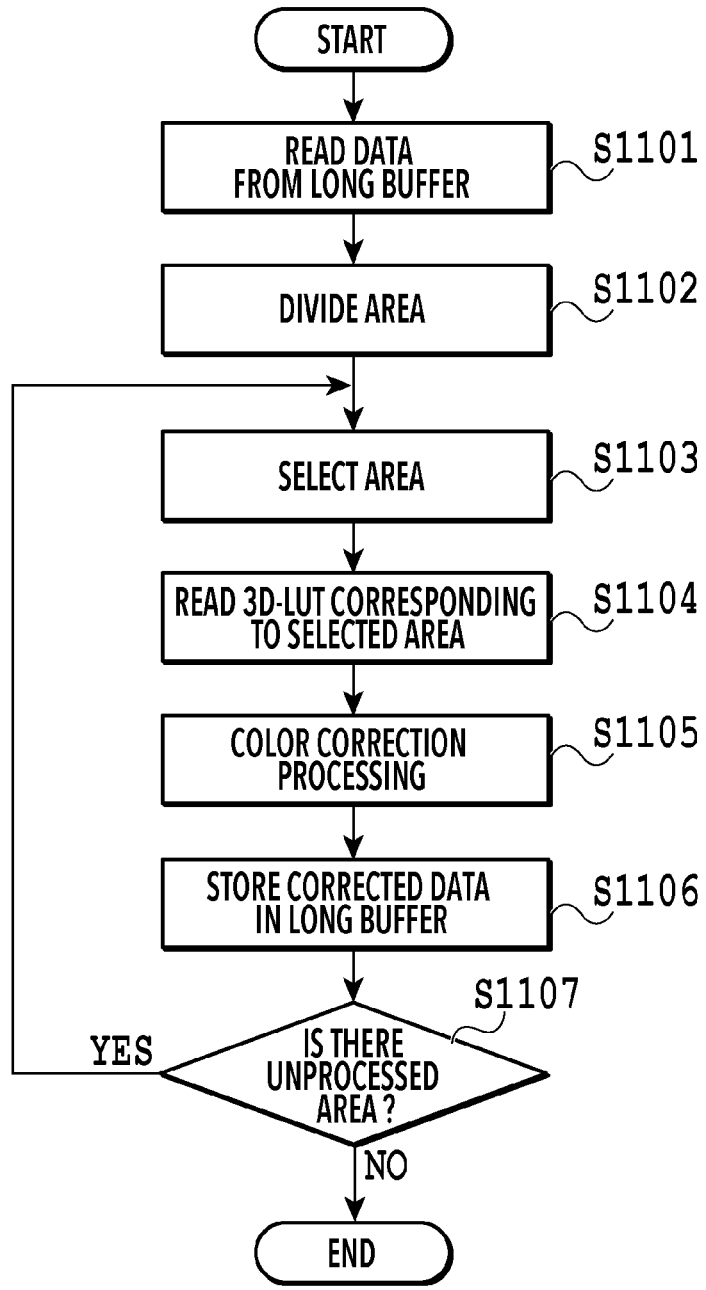
FIG. 11 is a flowchart illustrating the steps of color correction processing.

FIG. 11 is a flowchart illustrating the steps of color correction processing performed by the scanner image processing unit 207. The processing is started when the read data after the merging processing described with reference to the flowchart of FIG. 8 is stored in the RAM 203.

If the processing is started, in S1101, the scanner image processing unit 207 first reads the read data stored in the long memory in the RAM 203.

In S1102, the scanner image processing unit 207 divides the read data read in S1101 into a plurality of areas like the first to third areas in FIG. 5.

In S1103, the scanner image processing unit 207 selects one of the areas divided in S1102.

In S1104, the scanner image processing unit 207 reads one of a plurality of 3D-LUTs stored in the ROM 202 corresponding to the area selected in S1103.

In S1105, the scanner image processing unit 207 uses the LUT read in S1104 to perform conversion processing of detection values with respect to each pixel forming the area selected in S1103. More specifically, the scanner image processing unit 207 converts a combination of RGB luminance values corresponding to detection values of each pixel into a different combination of RGB luminance values.

In S1106, the scanner image processing unit 207 stores the read data converted in S1105 in a long buffer.

In S1107, the scanner image processing unit 207 determines whether there is an area not subjected to the color correction processing in the areas divided in S1102. If there is an area, the scanner image processing unit 207 returns to S1103 and performs the color correction processing with respect to the next area. If the color correction processing is completed with respect to all the areas, the processing is finished.

According to the present embodiment described above, merging processing using prepared mask patterns is performed for image areas corresponding to overlapping areas of a plurality of reading sensors. After that, 3D-LUTs prepared in association with the respective areas are used to convert RGB values of the areas into different RGB values. This makes it possible to output a read image conforming to a document, in which a color gap in a specific position and a color shift between the areas are reduced. In addition, according to the present embodiment, since the conversion processing uses the prestored 3D-LUTs, a processing load can be reduced and a read image can be generated at high speed as compared with Japanese Patent Laid-Open No. 2013-540390, in which correction coefficients are calculated and correction processing is performed at the time of reading a document.

FIG. 10 shows that one 3D-LUT is prepared for the third area corresponding to the overlapping area. However, in a case where there is a possibility of a finer gradual color shift in the overlapping area, the area may be further divided into small areas and different 3D-LUTs may be prepared for the areas.

Second Embodiment

The image processing apparatus described with reference to FIG. 1 to FIG. 4 is used also in the present embodiment. The present embodiment is different from the first embodiment in a method of merging processing. Returning to FIG. 5, in the present embodiment, detection values of pixels included in the third area are calculated by obtaining a weighted average of detection values of the first light receiving element group 501 and detection values of the second light receiving element group 502 based on predetermined weighting coefficients.

Figure 12:
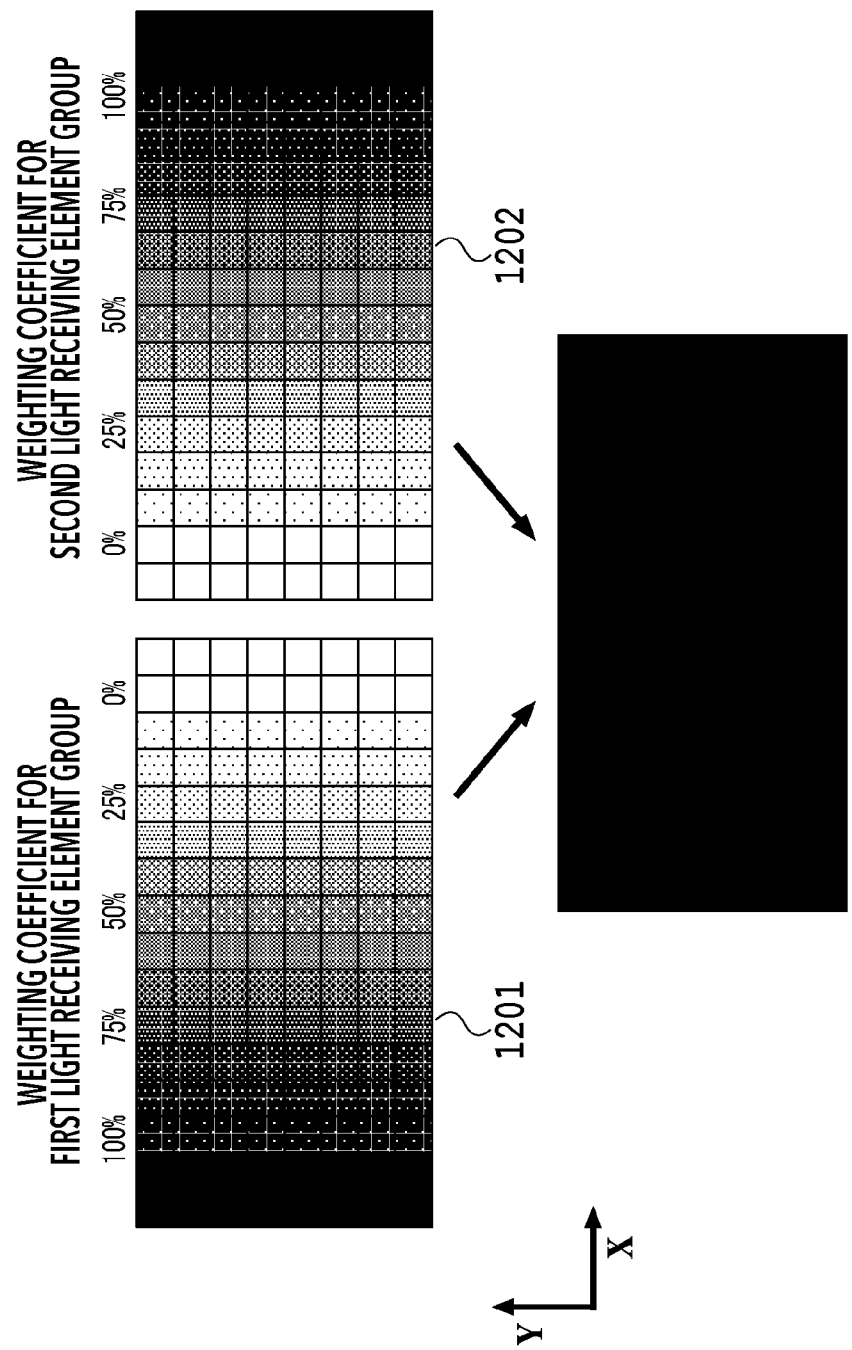
FIG. 12 is a diagram illustrating weighting coefficients used for merging processing.

FIG. 12 is a diagram illustrating weighting coefficients used for merging processing. A weighting coefficient 1201 is a weighting coefficient $\alpha 1$ for detection values of the first light receiving element group 501. A weighting coefficient 1202 is a weighting coefficient $\alpha 2$ for detection values of the second light receiving element group 502. The weighting coefficients $\alpha 1$ and $\alpha 2$ are set so as to change gradually according to pixel positions in the X direction in the overlapping area and satisfy $\alpha 1 + \alpha 2 = 1$ in any pixel position. That is, on the assumption that a detection value of the first light receiving element group 501 corresponding to a pixel is S1 and a detection value of the second light receiving element group 502 corresponding to that pixel is S2, a detection value S corresponding to the pixel after the merging processing is calculated by the following formula:

$$S = \alpha 1 \cdot S1 + \alpha 2 \cdot S2$$

The number of levels in which the weighting coefficients $\alpha 1$ and $\alpha 2$ are changed is not limited as long as $\alpha 1$ and $\alpha 2$ gradually decrease toward the ends of the reading sensors. For example, in a case where $\alpha 1$ and $\alpha 2$ are changed in four levels, the third area is further divided into four areas and $\alpha 1$ and $\alpha 2$ are set such that $\alpha 1 + \alpha 2 = 1$ in each area.

Further, on the assumption that the number of areas obtained by dividing the overlapping area into equal parts is N, a detection value of the first reading sensor in the j-th area is S1(j), and a detection value of the second reading sensor in the j-th area is S2(j), a detection value (j) in the j-th area may be calculated by the following formula:

$$S(j) = S1 \times (1 - j/N) + S2 \times (j/N)$$

The merging processing of the present embodiment can reduce a color gap in a specific position like the first embodiment. In addition, according to the present embodiment, the deterioration in granularity in the merged area described with reference to FIG. 9 can also be reduced.

Figure 13:
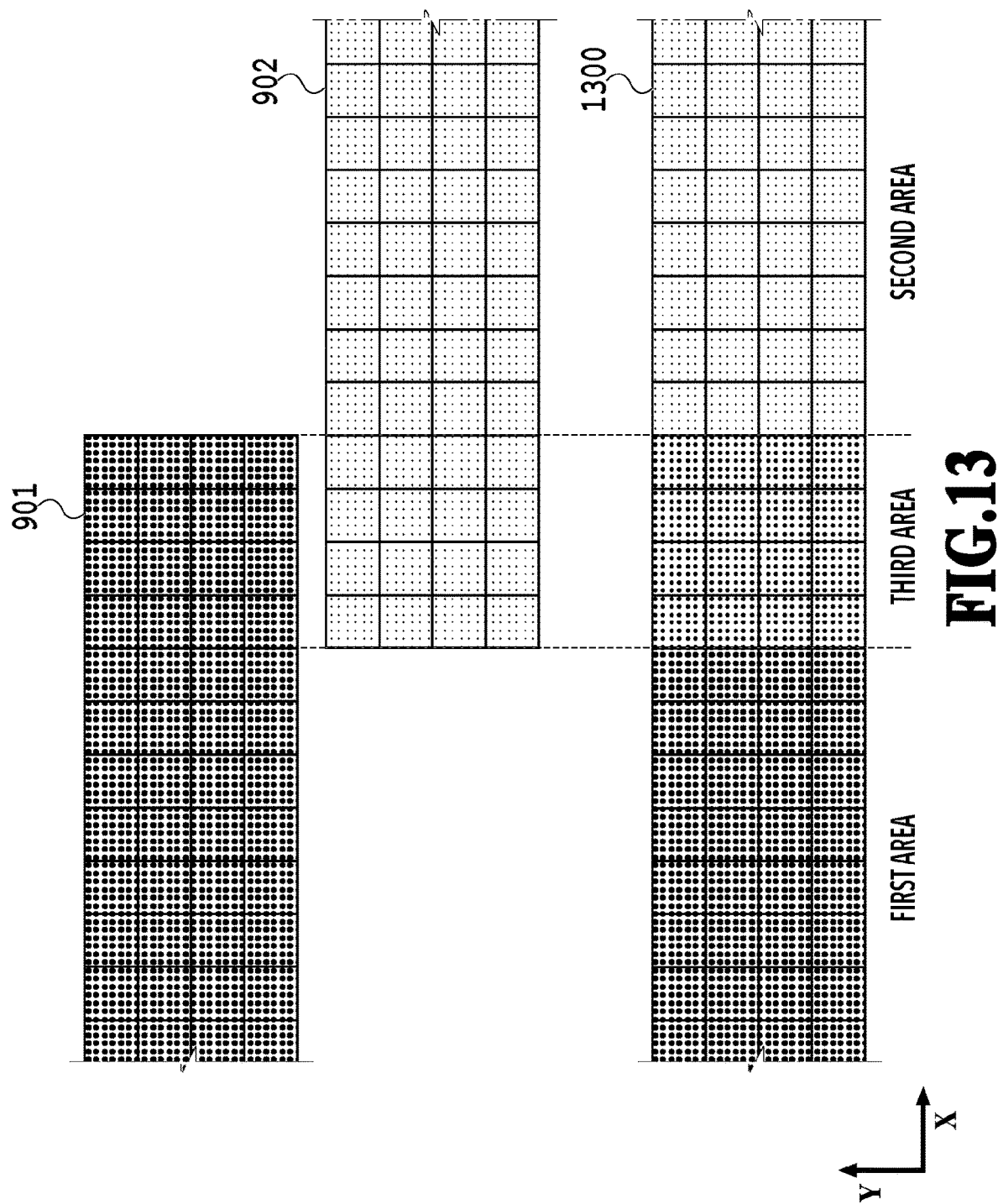
FIG. 13 is a diagram showing granularity in the case of performing merging processing.

FIG. 13 is a diagram showing granularity in the case of dividing the third area into four areas and performing the merging processing of the present embodiment. FIG. 13 schematically shows a read image 901 of the first reading sensor 304A, a read image 902 of the second reading sensor 304B, and a read image 1300 obtained by the merging processing. In the read image 1300, the first area has the same granularity as that of the read image 901 and the second area has the same granularity as that of the read image 902. In the third area for which the merging processing has been performed, the granularity is reduced by gradually averaging the granularity of the first area and the granularity of the second area.

After that, the color correction processing is performed according to the same method as the first embodiment, thereby obtaining a read image conforming to a document, in which a color gap in a specific position and a color shift between the areas are reduced. At this time, a 3D-LUT may be prepared for each of the areas obtained by dividing the third area for the merging processing. This can further improve the accuracy of color correction in the overlapping area.

Third Embodiment

The image processing apparatus described with reference to FIG. 1 to FIG. 4 is used also in the present embodiment. In the first and second embodiment, color correction processing is performed after merging processing. In contrast, in the present embodiment, merging processing is performed after color correction processing. That is, in the present embodiment, a 3D-LUT is prepared not for each area on a document but for each reading sensor 304.

Figure 14:
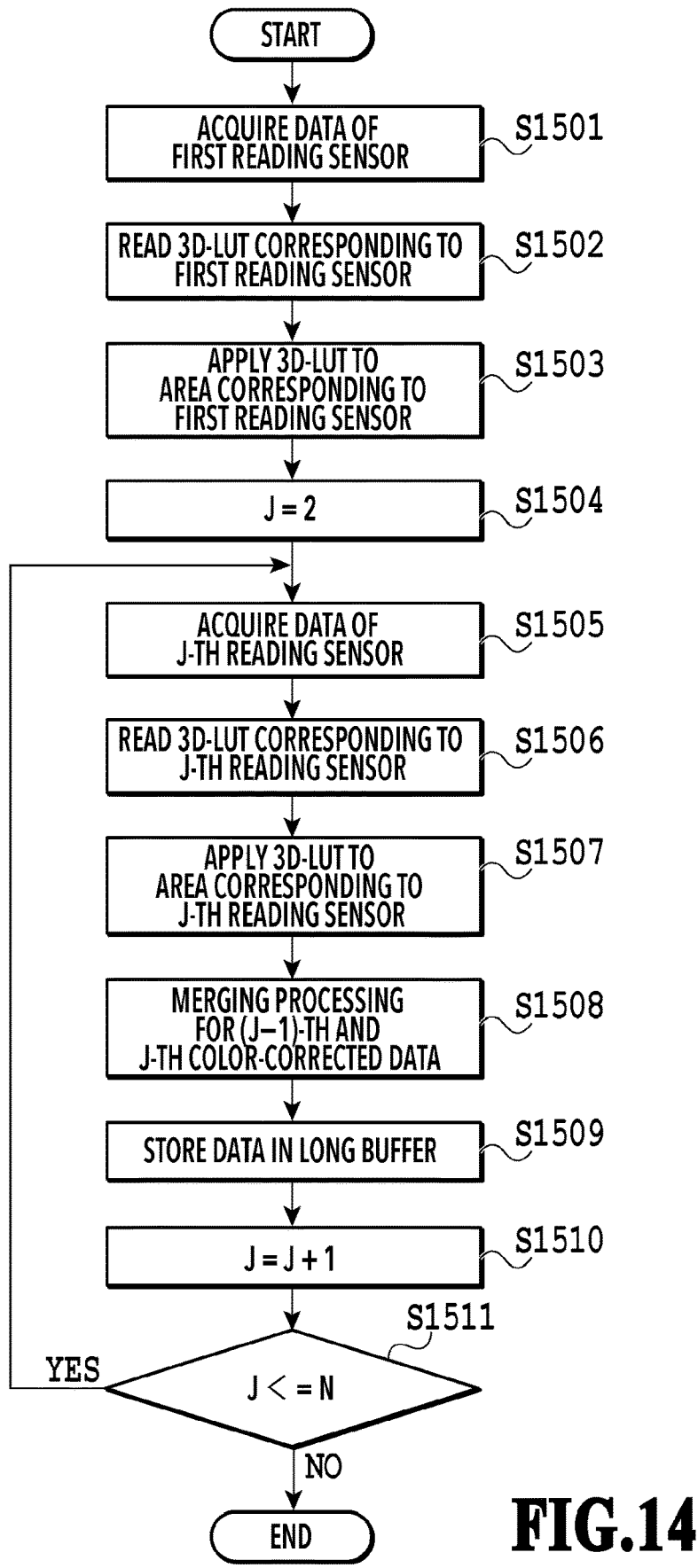
FIG. 14 is a flowchart illustrating the steps of color correction processing and merging processing.

FIG. 14 is a flowchart showing the steps of color correction processing and merging processing performed by the scanner image processing unit 207 of the present embodiment.

If the processing is started, in S1501, the scanner image processing unit 207 first acquires read data of the first (J=1) reading sensor 304 of the N (5 in the present embodiment) reading sensors 304 arrayed in the X direction.

In S1502, the scanner image processing unit 207 reads one of a plurality of 3D-LUTs stored in the ROM 202 corresponding to the first reading sensor 304.

In S1503, the scanner image processing unit 207 uses the 3D-LUT read in S1502 to perform color correction processing for the read data acquired in S1501.

In S1504, the scanner image processing unit 207 sets the variable J at J=2.

In S1505, the scanner image processing unit 207 acquires read data of the J-th reading sensor 304.

In S1506, the scanner image processing unit 207 reads one of the 3D-LUTs stored in the ROM 202 corresponding to the J-th reading sensor 304.

In S1507, the scanner image processing unit 207 uses the 3D-LUT read in S1506 to perform color correction processing for the read data acquired in S1505.

In S1508, the scanner image processing unit 207 performs merging processing for the read data of the (J−1)-th reading sensor 304 after the color correction processing and the read data of the J-th reading sensor 304 after the color correction processing. As the method of the merging processing, mask patterns may be used like the first embodiment or weighted average processing may be performed per color like the second embodiment.

In S1509, the scanner image processing unit 207 stores, in a long memory secured in the RAM 203, the read data on the area for which the merging processing has been performed in S1508.

After that, the scanner image processing unit 207 increments the variable J in S1510 and determines whether J≤N in S1511. In a case of J≤N, the scanner image processing unit 207 returns to S1505 and repeats the processing for the J-th reading sensor 304. In a case of J>N in S1511, the processing is finished.

According to the present embodiment described above, the merging processing is performed using read data mapped to a common color space by the color correction processing suitable for the reading sensor 304. That is, since the merging processing can be performed after a color gap caused by individual differences of the reading sensors 304 is corrected, a color gap in a specific position is reduced. In addition, in the present embodiment, the required number of 3D-LUTs for color correction is equal to the number of reading sensors 304. Thus, a memory area for storing the 3D-LUTs can be reduced as compared with the embodiments described above.

Other Embodiments

The embodiments described above use the MFP 200 equipped with the scanner unit 300 and the printer unit 400. However, the scanner function and the print function may be provided in different apparatus.

Figure 15:
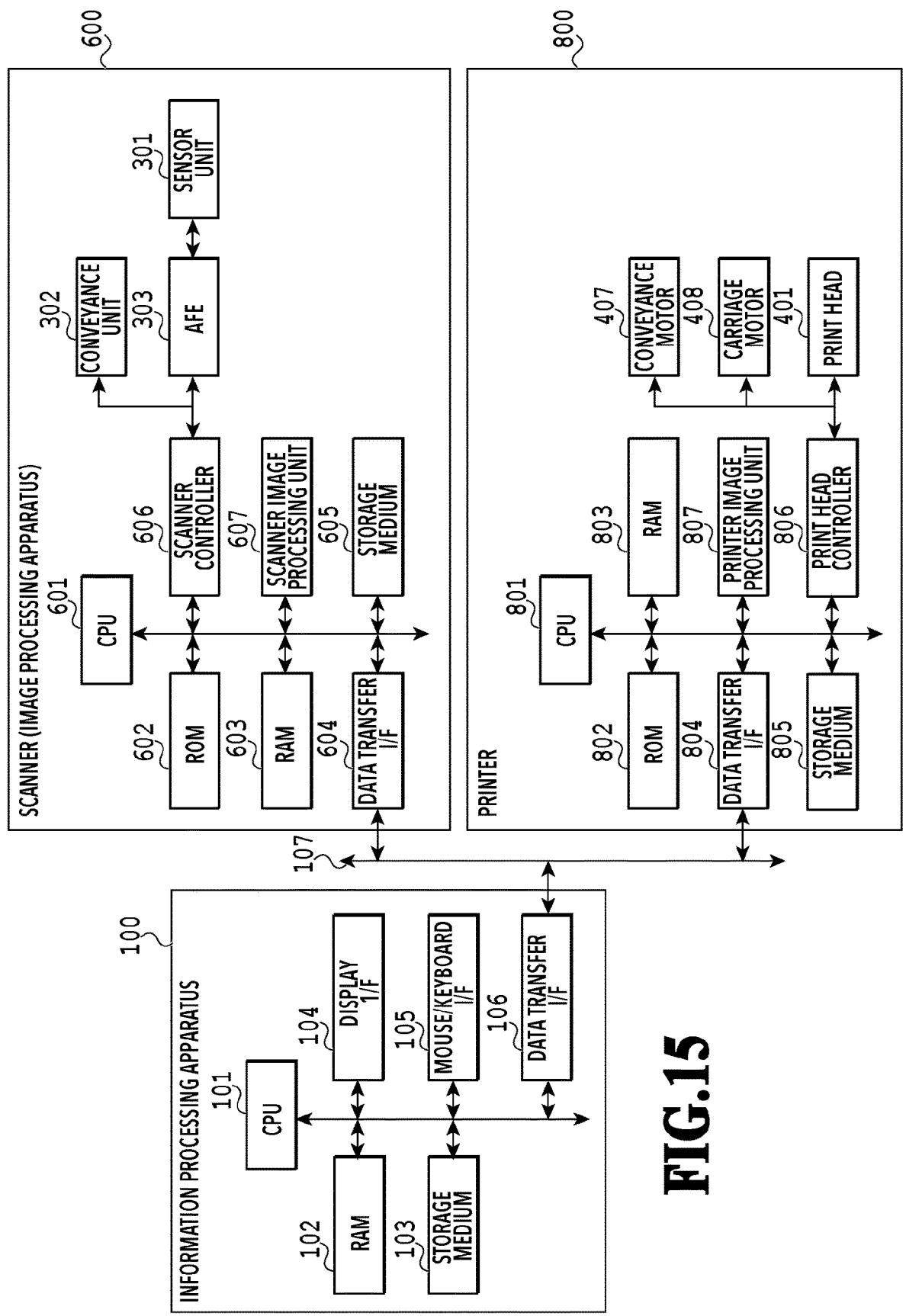
FIG. 15 is a diagram showing another example of an information processing system.

FIG. 15 is a diagram showing an information processing system in which a scanner 600 having the scanner function, a printer 800 having the print function, and the information processing apparatus 100 are connected to one another by the network 107. Even in the form shown in FIG. 15, the scanner function, the print function, and the copy function can be implemented through cooperation of the information processing apparatus 100, the scanner 600, and the printer 800. In this form, the information processing apparatus 100 can concurrently execute scanner operation in the scanner 600 and print operation in the printer 800. In this form, the scanner 600 which performs the series of image processing described in the above embodiments for read data acquired by the scanner unit 300 corresponds to an image processing apparatus of the present invention.

In the first to third embodiments, 3D-LUTs are prepared for color correction processing. However, the method of conversion is not limited provided that coordinates (R, G, B) in a three-dimensional RGB color space can be converted into different coordinates (R, G, B) capable of representing a desired color. For example, in calibration processing, a three-dimensional matrix operation formula may be calculated per area based on read data on the color correction document 1000 and stored in the ROM 202. In this case, reading processing of a document is accompanied with calculation of conversion destination coordinates using read matrix operation formulas.

At this time, the three-dimensional color space does not necessarily use R, G, and B as coordinate axes. For example, luminance values R, G, and B of detection values obtained from each reading sensor may be converted into L*, a*, and b* values in a L*a*b* space. In either case, it is only necessary to convert a combination of color signals defining a point in a color space into a combination of color signals defining a different point. The same advantageous result as the embodiments described above can be achieved as long as the conversion is performed based on correction characteristics prepared per area.

The embodiments described above use the reading sensor 304 in which CISs are arrayed as the light receiving elements 313. However, CCDs can also be used as the light receiving elements 313. In the case of using CCDs, there is no shift in spectral characteristics caused by light sources as described with reference to FIG. 6, whereas a shift occurs in color characteristics of three color filters. That is, even in the case of using a reading sensor with an array of CCDs, the same problem as the case of using a reading sensor with an array of CISs occurs and the embodiments described above function effectively.

In the above description, the scanner image processing unit, which is an image processing accelerator, performs the color correction processing per area or per reading sensor 304 in accordance with the flowchart of FIG. 11 or FIG. 14. However, the image processing accelerator can be configured to perform parallel processing like a GPU. In this case, processing with a heavy load such as reading of 3D-LUTs and conversion processing of detection values can be performed in parallel per area or per reading sensor. As a result, the entire image processing described above can be performed at higher speed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-002034 filed Jan. 9, 2020, which is hereby incorporated by reference wherein in its entirety.

What is claimed is:

1. An image processing apparatus comprising:
a first reading sensor comprising a plurality of light receiving elements arrayed in a predetermined direction;
a second reading sensor comprising a plurality of light receiving elements arrayed in the predetermined direction, the second reading sensor being arranged so as to have an overlapping area with the first reading sensor in the predetermined direction; and
one or more processors and one or more computer-readable media serving as:
an acquisition unit configured to acquire read data generated by the first reading sensor reading an image on a document during relative movement of the document and the first reading sensor in a cross direction crossing the predetermined direction and read data generated by the second reading sensor reading an image on the document during relative movement of the document and the second reading sensor in the cross direction; and
an image processing unit configured to generate a read image of the document by performing predetermined image processing for read data of the first reading sensor and read data of the second reading sensor,
wherein the predetermined image processing includes color correction processing of correcting a combination of color signals corresponding to respective color components detected by the light receiving elements to different color signals such that coordinates represented by the color signals are converted into different coordinates in a color space, with respect to each of pixels forming each of read data of the first reading sensor and read data of the second reading sensor, and
the image processing unit performs the color correction processing for first read data obtained from light receiving elements of the first reading sensor not included in the overlapping area and the color correction processing for second read data obtained from light receiving elements of the second reading sensor not included in the overlapping area in accordance with different correction characteristics, and
wherein before the color correction processing, the image processing unit generates third read data by combining color signals obtained from light receiving elements of the first reading sensor included in the overlapping area with color signals obtained from light receiving elements of the second reading sensor included in the overlapping area, and
the image processing unit performs the color correction processing for the third read data in accordance with a correction characteristic different from the color correction processing for the first read data and the second read data, and
the image processing unit generates the third read data by using mask patterns in which adoption or non-adoption of the color signals from the first reading sensor and the second reading sensor is determined per pixel.

2. The image processing apparatus according to claim 1, wherein the image processing unit generates the third read data by calculating a weighted average of color signals from the first reading sensor and color signals from the second reading sensor in accordance with weighting coefficients associated with pixel positions in the overlapping area.

3. The image processing apparatus according to claim 1, wherein the image processing unit divides the third read data into a plurality of areas in the predetermined direction and performs the color correction processing for read data on the areas in accordance with different correction characteristics.

4. The image processing apparatus according to claim 1, wherein after the image processing unit performs the color correction processing for read data obtained from light receiving elements of the first reading sensor included in the overlapping area and the color correction processing for read data obtained from light receiving elements of the second reading sensor included in the overlapping area in accordance with different correction characteristics, the image processing unit generates a read image of the overlapping area by combining results of the color correction processing performed in accordance with the different correction characteristics.

5. The image processing apparatus according to claim 1, wherein the image processing unit performs the color correction processing in accordance with the different correction characteristics by using different three-dimensional look-up tables or three-dimensional matrices operation formula.

6. The image processing apparatus according to claim 5, further comprising a unit configured to generate the different three-dimensional look-up tables or three-dimensional matrix operation formula based on read data generated by each of the first reading sensor and the second reading sensor reading a common color correction document.

7. The image processing apparatus according to claim 1, wherein the color correction processing is processing of converting RGB color signals into different RGB color signals.

8. The image processing apparatus according to claim 1, wherein the color correction processing is processing of converting RGB color signals into L*a*b* color signals.

9. The image processing apparatus according to claim 1, wherein the first reading sensor and the second reading sensor comprise different light sources.

10. An image processing method for performing predetermined image processing for read data of a first reading sensor and read data of a second reading sensor and generating a read image of a document by an image processing apparatus, the image processing apparatus comprising:
the first reading sensor comprising a plurality of light receiving elements arrayed in a predetermined direction;
the second reading sensor comprising a plurality of light receiving elements arrayed in the predetermined direction, the second reading sensor being arranged so as to have an overlapping area with the first reading sensor in the predetermined direction;

the image processing method comprising:
acquiring read data generated by the first reading sensor reading an image on a document during relative movement of the document and the first reading sensor in a cross direction crossing the predetermined direction and read data generated by the second reading sensor reading an image on the document during relative movement of the document and the second reading sensor in the cross direction, and
correcting a combination of color signals corresponding to respective color components detected by the light receiving elements to different color signals such that coordinates represented by the color signals are converted into different coordinates in a color space, with respect to each of pixels forming each of read data of the first reading sensor and read data of the second reading sensor,
wherein in the correcting, color correction processing for first read data obtained from light receiving elements of the first reading sensor not included in the overlapping area and color correction processing for second read data obtained from light receiving elements of the second reading sensor not included in the overlapping area are performed in accordance with different correction characteristics, and
wherein before the color correction processing, third read data is generated by combining color signals obtained from light receiving elements of the first reading sensor included in the overlapping area with color signals obtained from light receiving elements of the second reading sensor included in the overlapping area,
the color correction processing is performed for the third read data in accordance with a correction characteristic different from the color correction processing for the first read data and the second read data, and
the third read data is generated by using mask patterns in which adoption or non-adoption of the color signals from the first reading sensor and the second reading sensor is determined per pixel.

* * * * *